Aug. 13, 1929.                    V. LANCIA                    1,724,845
                             SPAR FOR VEHICLE FRAMES
                              Filed May 22, 1928
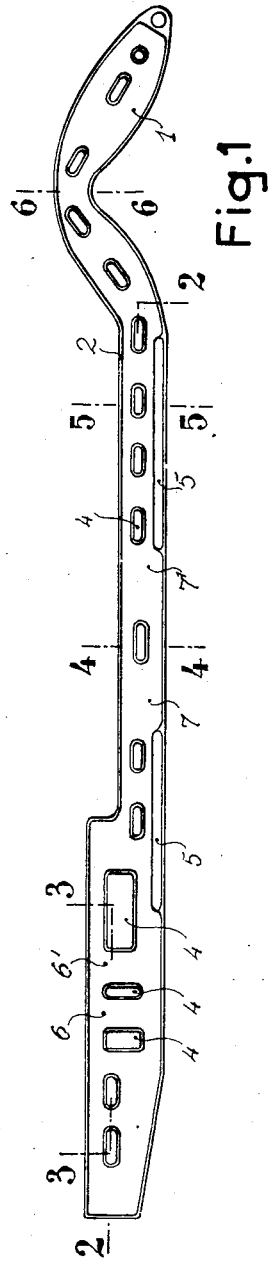
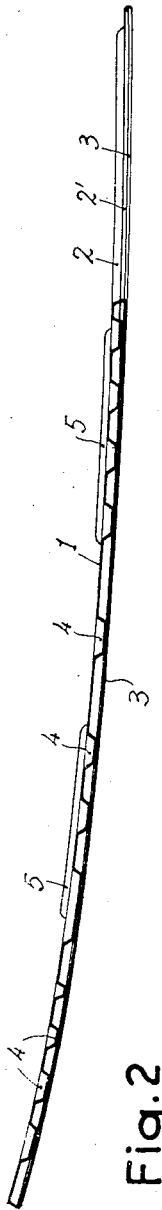
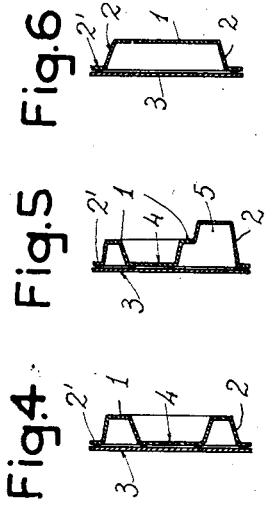
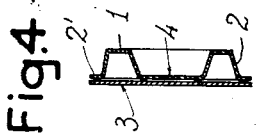
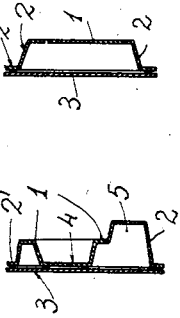
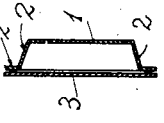

Patented Aug. 13, 1929.

1,724,845

UNITED STATES PATENT OFFICE.

VINCENZO LANCIA, OF TURIN, ITALY.

SPAR FOR VEHICLE FRAMES.

Application filed May 22, 1928, Serial No. 279,751, and in Italy June 6, 1927.

The present invention relates to the construction of frames for motor vehicles and it has for its object a spar for such frames made of stamped metal and having box shape, it being light and stiff in all directions and having depressions and projections adapted to be availed of for mounting parts of the vehicle mechanism.

On the annexed drawing is illustrated by way of example an embodiment of a side bar according to this invention and Figure 1 is a side view of the main portion of the spar with its flat covering member removed;

Figure 2 is a plan section on line 2—2 of Figure 1;

Figure 3 shows to an enlarged scale a section on line 3—3 of Figure 1;

Figure 4 is a section on line 4—4 of Figure 1, to an enlarged scale;

Figure 5 is a section on line 5—5 of Figure 1, to an enlarged scale and

Figure 6 is a section on line 6—6 of Figure 1, to an enlarged scale.

As shown in said figures, a spar according to the present invention and intended to provide a member of a vehicle frame consists of an element 1 of stamped sheet metal, which has the longitudinal configuration required by the purpose it is intended for, and is provided, along its edge, with a flange 2 which imparts it the character of a C-section member.

As shown on the drawing the bottom or most extensive portion of the said C-section is intended to lie vertically when the spar is embodied in the vehicle frame.

The spar is completed by a second member consisting of a plate or flat sheet 3 which closes the mouth or open side of the C-section of the main element 1, it being fastened thereon by means of the overturned portion 2' of the flange 2; the spar has thus in its whole a box shape while its cross section is a closed line.

Member 1 is stiffened by recessed portions 4 either open on their front faces or not, which reach the level of the overturned portion 2' of flange 2, and by their projecting face said recessed or embossed portions are fastened on the outer sheet 3 by any suitable means as by welding, or rivets or the like.

Said member 1 has further longitudinal ribs as 5 projecting on its internal surface, that is on the surface of said member which is inside the frame of vehicle in which the spar is embodied.

Embossed portions 4 have variable size and arrangement along the spar 1, and are in larger number in portions where the spar is more heavily loaded by warping stresses. They may have circular or elongated or polygonal shape and are arranged in such a manner as to provide interspaces for attachment of parts of the vehicle which are required to be fastened on the spar.

Thus, by way of example, in the front portion of the spar which registers with the portion of the vehicle frame occupied by the vehicle engine, the embossed portions 4 leave intermediate spaces 6—6' for attaching braces or the like to which the engine is secured, and in the intermediate portion of the spar said portions 4 leave flat spaces 7—7' for attaching the ends of one or more cross bars thereon.

Ribs 5 provide longitudinal projecting portions which extend along a more or less long portion of the spar and are used for supporting the vehicle footboard.

Spars provided in the described manner are rigid in all directions and have a large resistance to stresses acting to warp it, while the weight is exceedingly reduced.

It has the further advantage that the embossed portions intended to strengthen it are also effective in the provision of the vehicle frame and in mounting other members thereon.

What I claim as my invention and desire to secure by United States Letters Patent is:—

1. A box-shaped spar for the frames of automotive vehicles comprising a sheet metal section having a peripheral flange and embossed portions projecting in the same direction as said flange, and a second sheet metal section fastened to the edge of said flange of the first named section and to the said embossed portions of the same.

2. A box shaped spar for the frames of automotive vehicles comprising a sheet metal section having a peripheral flange and embossed portions projecting in the same direction and to the same extent as said flange, and a flat sheet metal section fastened to the edge of said flange of the first named section and to the front ends of said embossed portions of the same.

3. A box shaped spar for the frames of automotive vehicles comprising an inner sheet metal section having a peripheral flange directed outwardly and embossed portions projecting in the same direction as said flange, and an external sheet metal section fastened to the edge of said flange of said inner section and to the front ends of said embossed portions of the same.

4. A box shaped spar for the frames of automotive vehicles comprising an inner sheet metal section having a peripheral flange directed outwardly and embossed portions projecting in the same direction and to the same extent as said flange, and a flat external sheet metal section fastened to the edge of said flange of said inner section and to the front ends of said embossed portions of the same.

5. A box shaped spar for the frames of automotive vehicles comprising an inner sheet metal section having a peripheral flange directed outwardly and embossed portions projecting in the same direction as said flange and ribs projecting in the opposite direction, and an external sheet metal section fastened to the edge of said flange of said inner section and to the front ends of said embossed portions of the same.

In testimony whereof I have signed my name to this specification.

VINCENZO LANCIA.